United States Patent [19] | [11] 4,283,731
Bok et al. | [45] Aug. 11, 1981

[54] INK JET PRINTING APPARATUS

[75] Inventors: Dennis E. Bok; Patrick E. Bridge, both of Dayton; Robert W. Coulter, Xenia; George W. Denlinger, Springboro; Clifford S. Fernalld, Jr., Xenia; Charlie H. Hill, Jr., Dayton; David A. Huliba, Kettering; James R. Meckstroth; Robert J. Scranton, both of Centerville, all of Ohio

[73] Assignee: The Mead Corporation, Dayton, Ohio

[21] Appl. No.: 142,787

[22] Filed: Apr. 22, 1980

[51] Int. Cl.³ ........................ G01D 15/18; G01D 9/00
[52] U.S. Cl. ........................................ 346/75; 346/25
[58] Field of Search .................................. 346/25, 75

[56] References Cited

U.S. PATENT DOCUMENTS

| | | | |
|---|---|---|---|
| 3,813,676 | 5/1974 | Wolfe | 346/75 |
| 3,869,986 | 3/1975 | Hubbard | 346/75 X |
| 3,892,174 | 7/1975 | Marcher . | |
| 3,913,719 | 10/1975 | Frey | 346/75 X |
| 3,968,498 | 7/1976 | Uchiyama . | |
| 4,029,006 | 6/1977 | Mercer | 346/75 X |
| 4,074,279 | 2/1978 | Ikeda et al. | 346/75 |
| 4,080,607 | 3/1978 | Van Breemen et al. | 346/75 |
| 4,122,457 | 10/1978 | Erikson et al. | 346/75 |

FOREIGN PATENT DOCUMENTS

| | | |
|---|---|---|
| 53-4261 | 4/1978 | Japan . |
| 1540830 | 2/1979 | United Kingdom . |
| 1566342 | 4/1980 | United Kingdom . |

*Primary Examiner*—George H. Miller, Jr.
*Attorney, Agent, or Firm*—Biebel, French & Nauman

[57] ABSTRACT

An ink jet printing apparatus for printing addresses on documents being transported along an independently operated conveyor. The printing apparatus includes a control console, a printing arm telescopically received within the console, and an ink jet printing head mounted on a carriage which is vertically movable within the printing arm. A tachometer wheel is mounted on the printing carriage for contacting a document being transported past the printing head and generating a tachometer signal in response thereto. A programmed microprocessor generates printing control signals in synchronism with the tachometer signal.

22 Claims, 11 Drawing Figures

INK JET PRINTING APPARATUS

BACKGROUND OF THE INVENTION

This invention relates generally to ink jet printing apparatus of a type suitable for printing addresses on preprinted documents, such as magazines, newspapers and the like. Prior art systems for such purposes have generally employed electrostatic printers or other devices for printing a strip of labels. The printed labels then have been applied to the magazines or newspapers by a suitable label application device. A typical prior art apparatus for feeding preprinted documents and applying such labels thereto is disclosed in Ridenour U.S. Pat. No. 2,606,681.

An example of a prior art system which feeds preprinted documents and prints addresses directly thereon is disclosed in Erikson et al U.S. Pat. No. 4,122,457. The Erikson system utilizes a plurality of ink jet printing nozzles which are oscillated back and forth across a moving document to print lines of characters. The printing speed of the jets limits each jet to a printing output rate of about 250 characters per second. This translates into a document feed rate of only about 125 ft./min., which is much too slow for many applications.

It is well known that ink jet printing can be carried out at much faster speeds than the upper limit mentioned above in connection with the Erikson system. Printers for such high speed printing may generate rows of closely spaced jets, which may be stimulated, charged, deflected, and selectively caught as taught in Mathis U.S. Pat. No. 3,701,998. Such print heads are commercially employed for business forms printing and routinely print documents as they are being transported at a speed of 600 ft./min. Still higher speed applications are described in Frey U.S. Pat. No. 3,913,719 which teaches an ink jet printing apparatus operating in combination with a conventional newspaper printing press.

Heretofore the above mentioned high speed ink jet printers have not been used for addressing purposes due to their relatively high cost and also due to the fact that the industry already has a large investment in conventional addressing systems of the general type described in Ridenour U.S. Pat. No. 2,606,681. Such conventional addressing systems are able to address documents at a reasonably fast speed, but the requirement for off-line printing of address labels and the application of such labels to the documents has been both cumbersome and expensive.

SUMMARY OF THE INVENTION

This invention provides improved high speed document addressing by combining a known high speed ink jet printer in a novel manner with a conventional document handling and feed system. The print head is supported by a printing arm which is movably mounted on a portable control console. The control console is adapted for placement adjacent the document feeder, and the printing arm is mounted on the control console in such a manner that it extends into a printing position over the feeder when the control console is placed adjacent thereto. Means are provided for moving the printing arm into a storage position which is clear of the document feeder, when printing has been completed.

The printer prints directly upon the face of documents, without any need for application of address labels. Thus compatibility with existing addressing systems is achieved by merely removing the label applicator therefrom. When the print arm of the present invention is extended into the printing position, it occupies the space which previously had been occupied by the label applicator.

For further compatibility with existing document feeders, the print head of the present invention is supported for vertical movement relative to the printing arm. Thus when the printing arm is in the printing position, the print head may be lowered to the correct height for printing documents of any desired thickness. A sensor mounted on the printing arm senses the approach of a document to be printed, and tachometer means, which are also mounted on the printing arm, sense the speed of movement of the document and generate a speed synchronizing signal. In this manner the printed area is maintained in registration on the documents, and the printing operation proceeds in synchronism with document movement.

DESCRIPTION OF THE PREFERRED EMBODIMENTS

Figure 1:
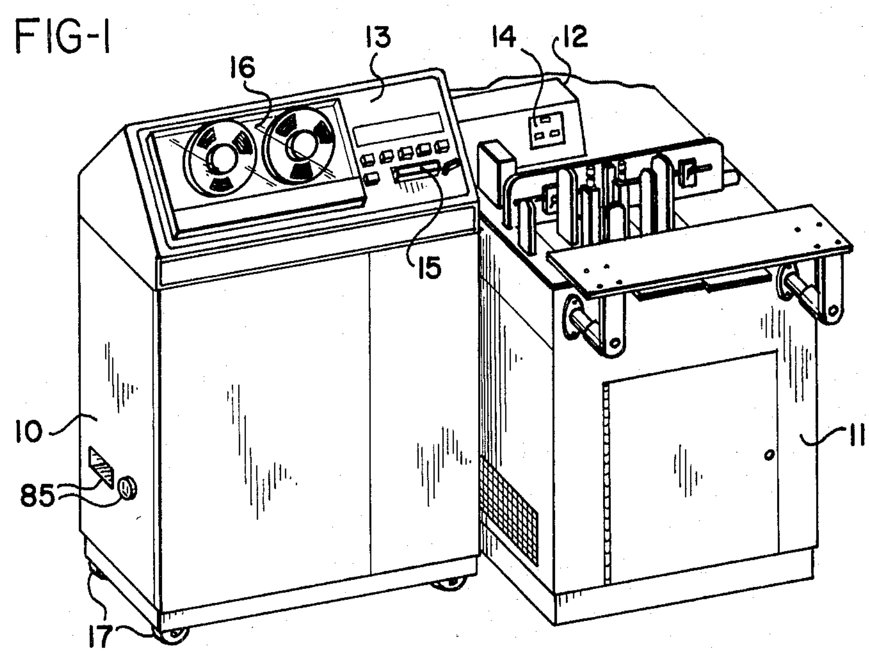
FIG. 1 is a pictorial illustration of an addressing system including a prior art document feeding apparatus and an ink jet printer which is constructed in accordance with this invention.

A document addressing system in accordance with this invention is illustrated in FIG. 1, wherein a portable ink jet printing console 10 is positioned alongside a document feeder 11. Concole 10 is supported by a set of wheels 17 for ready portability and has an extendable printing arm 12, which extends out over feeder 11. Document feeder 11 may be any one of a number of commercially available devices, such as, for instance, a device known in the trade as a Cheshire, Model 524.

Document feeder 11 includes means for removing individual documents from a stack, means for feeding the documents in single file under printing arm 12. An ink jet print head, as hereinafter described, is carried by print arm 12 for addressing the documents during passage thereunder. Since document feeder 11 forms no part of this invention and is well-known in the trade, descriptive details thereof are not contained herein. For a general description of the operation of such document unstacking, feeding, and stacking mechanisms, reference may be made to Ridenour U.S. Pat. No. 2,606,681. As described in the Ridenour patent, there is a label application device for applying preprinted address labels to magazines being transported thereunder. For use in connection with this invention, the label application device is removed to make room for printing arm 12.

A supervisor control panel 13 is mounted on the front of console 10. Control panel 13 includes a series of switches for enabling a supervisory employee to make all the necessary settings and adjustments for a particular addressing job. The controls on control panel 13 ordinarily are not operated by production personnel. An operator control panel 14 is mounted on print arm 12 for such use. The controls on control panel 14 are relatively simple on/off print head operating controls. Control panel 14 preferably also includes an error light, for indicating system conditions requiring intervention by the supervisor or skilled non-production personnel.

Data codes corresponding to the mailing addresses to be printed are carried by a magnetic tape, which is mounted on a tape drive unit 16 within console 10. There is an opening within supervisor control panel 13 into which may be inserted a font cartridge 15. A series of font codes representing dot matrix characters to be printed by the ink jet printer are carried by a read only memory, which is installed within cassette 15. The data processing subsystem reads the magnetic tape on the ROM and controls the ink jet print head, as hereinafter described.

Figure 2:
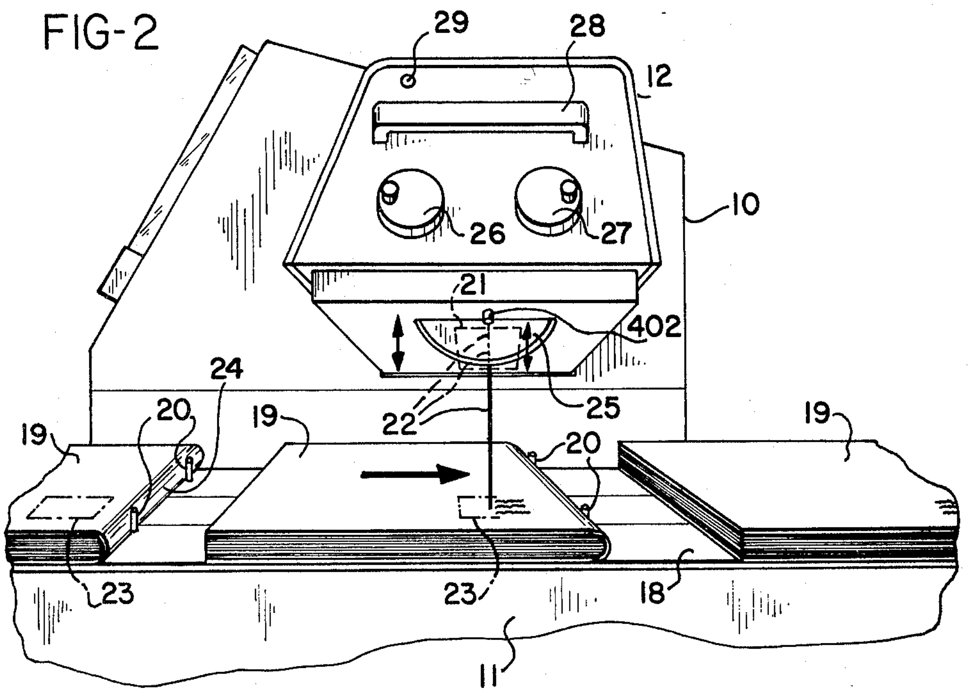
FIG. 2 is a pictorial representation of the printing operation of the ink jet printer of this invention.

The printing operation of the system may be generally understood by reference to FIG. 2, wherein a conveyor 18 is transporting a series of documents 19 under printing arm 12. Documents 19 are positioned against timing lugs 20, which provide timing control for document feeder 11. Timing lugs 20 do not control the operation of the ink jet printer in any way.

Figure 11:
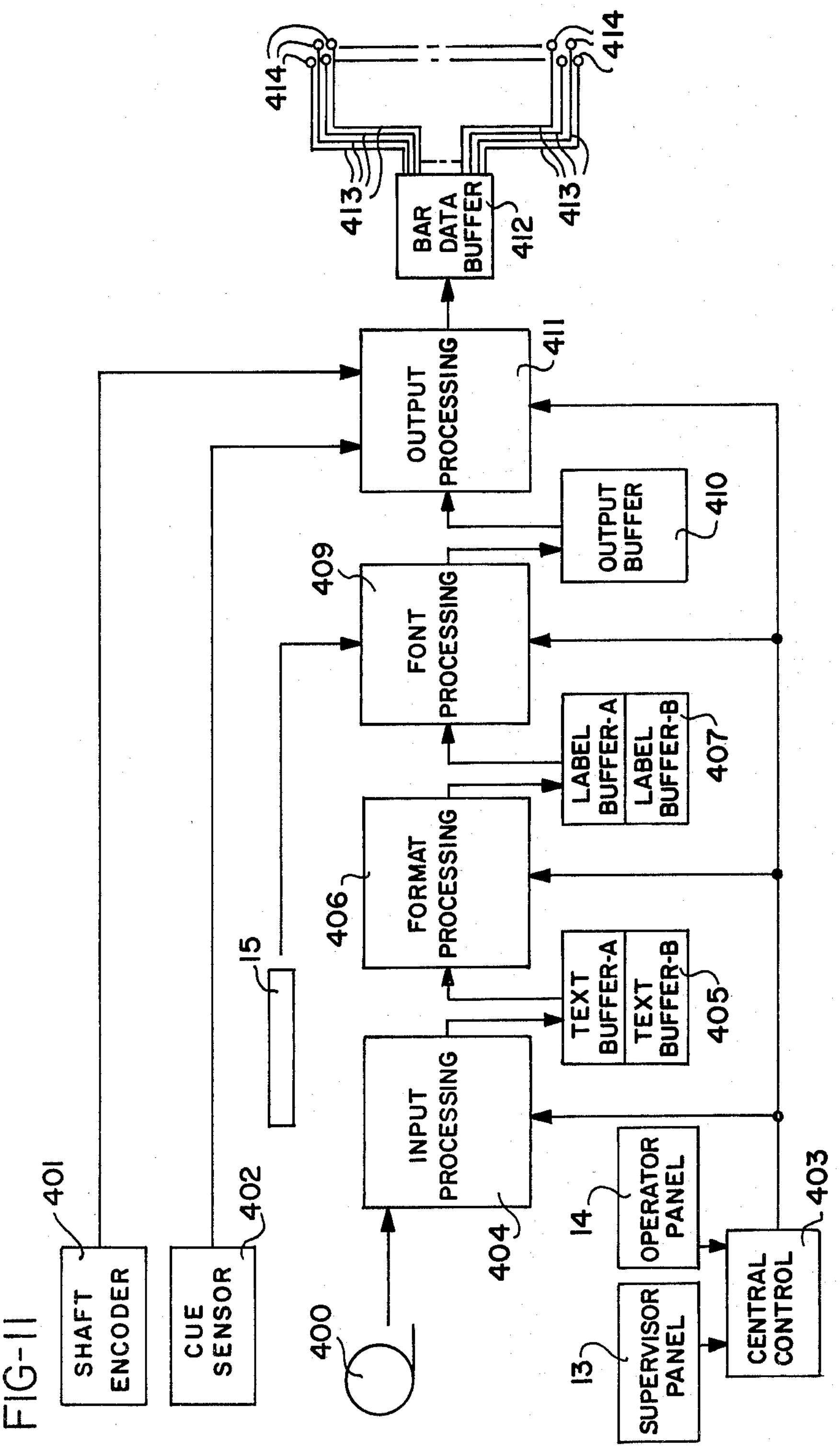
FIG. 11 is a block diagram of the data processing subsystem of the novel ink jet printing apparatus.

Mounted within printing arm 12 is an ink jet print head, which is illustrated generally at 21 and which generates a series of jets 22. Print head 21 may be constructed as generally described in Mathis U.S. Pat. No. 3,701,998, and a detailed description thereof is not contained herein. A jet printer of this type generates two parallel rows of closely spaced jets. A stimulation device as described in Mathis, or other stimulation device as disclosed in Cha U.S. Pat. No. 4,095,232 causes the jets to break up into streams of uniformly sized and regularly spaced drops. A series of charge rings 414 (see FIG. 11) produce electrical charging of selected ones of the drops, as required for printing the desired addresses. Those drops which are so charged are deflected by a pair of deflection fields into a pair of catchers. The drops which are uncharged fall toward documents 19 and print addresses within address areas 23.

Figures 5, 6:
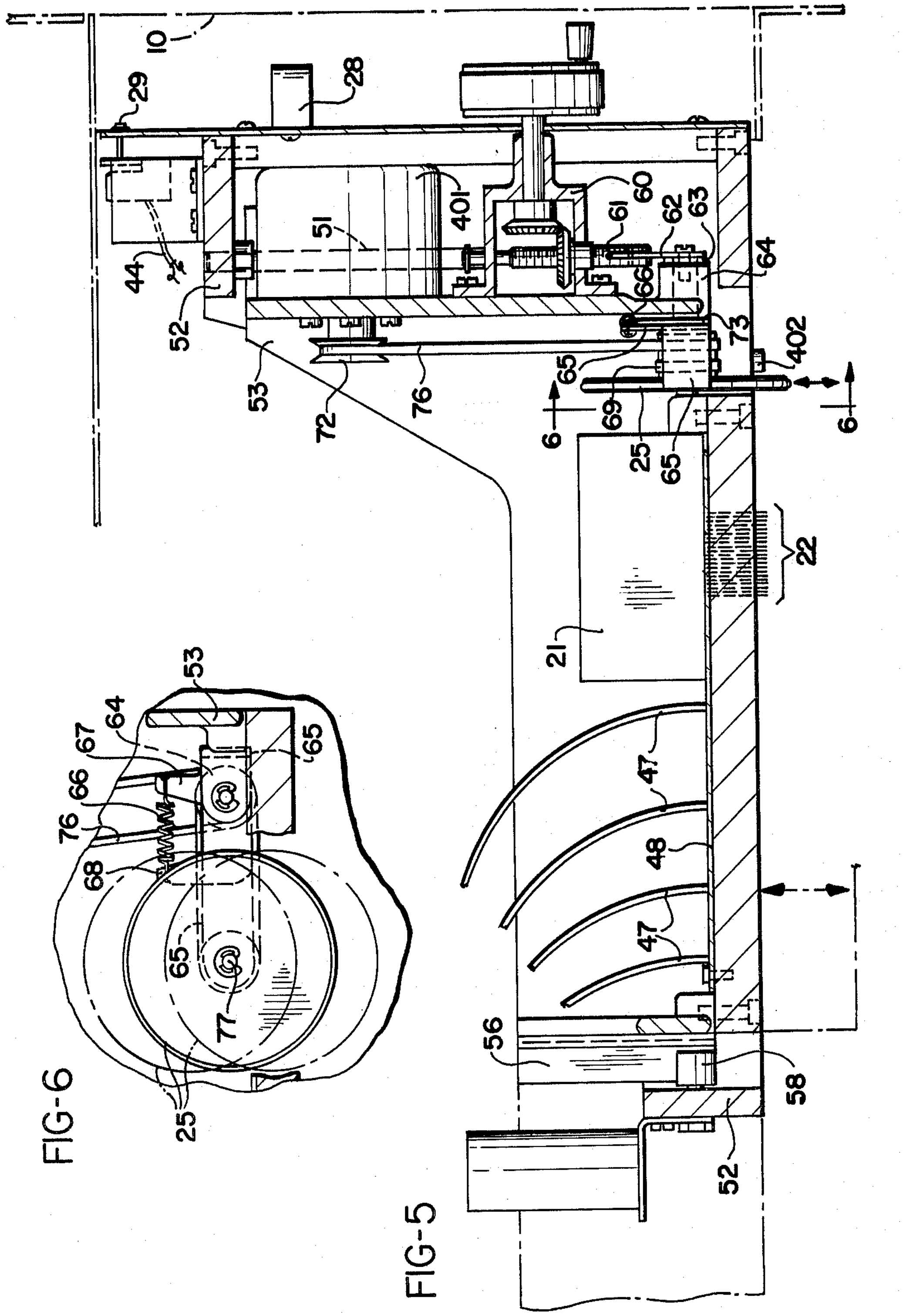
FIG. 5 is a view taken along lines 5—5 of FIG. 4.
FIG. 6 is an illustration of a tachometer wheel.

For illustration purposes FIG. 2 shows a large vertical separation between print arm 12 and documents 19. In reality this distance is only about 2 inches. As hereinafter described in detail, vertical positioning means, including a control knob 27, are provided for lowering print head 21 relative to printing arm 12, so as to achieve a printing distance of about 0.25 inches. Jets 22 generally occupy a region as illustrated in FIG. 5, although it will be understood that FIG. 5 illustrates print head 21 in a fully raised position wherein printing is not performed.

In order to maintain registration of the ink jet printing within the address areas 23 of documents 19, printing arm 12 carries a cue sensor 402. Cue sensor 402 is a conventional two-way photoelectric sensor which is positioned for illuminating and sensing the leading edge 24 of a document 19. Cue sensor 402 provides a control signal, which enables the data processing subsystem to initiate printing at the proper time.

In order to maintain the printing in synchronism with the movement of document 19 printing arm 12 carries a tachometer wheel 25. Tachometer wheel 25 drives a conventional shaft encoder 401 (FIGS. 4 and 5), which generates tachometer pulses in synchronism with document movement. These pulses enable the data processing subsystem to exercise proper timing control over the operation of the ink jet printer. For a better understanding of matters relating to such timing control, reference may be made to Van Brimer et al U.S. Pat. No. 3,588,906, Van Brimer et al U.S. Pat. No. 3,803,628, and Frey U.S. Pat. No. 3,913,719. Tachometer wheel 25 is vertically adjustable for surface contact against documents 19. For this purpose there is provided a hand operated control knob 26 on printing arm 12.

Figure 3:
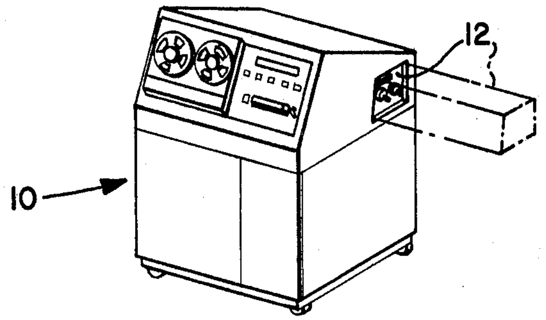
FIG. 3 is a pictorial representation of the ink jet printing apparatus with its printing arm in the storage position.

As illustrated in FIGS. 1 and 2, printing arm 12 is extended toward an operating position. When not in use, printing arm 12 is moved inwardly toward a storage position, as best illustrated in FIG. 3. A handle 28 is provided for moving print head 12 from the storage position to a printing position. A release button 29 is provided for releasing a "fail-safe" braking arrangement to enable positioning of the print arm 12 at any desired position of extension over conveyor 18. The braking arrangement, as hereinafter described, is normally engaged and is momentarily released by a solenoid, which is connected for activation by button 29.

The system as herein described prints addresses on documents moving along conveyor 18 at speeds up to 460 ft. per minute. A resolution of 120 lines per inch is maintained by selective charging of drops in 128 jets arranged in two staggered lines, the jets in each line being spaced at a spacing of 60 jets per inch. Coordinated charging of the jets in the two rows is carried out as taught by Taylor et al U.S. Pat. No. RE28,219. Each jet is stimulated to produce dots at a frequency which may be in the order of about 50 KHz.

Figure 4:
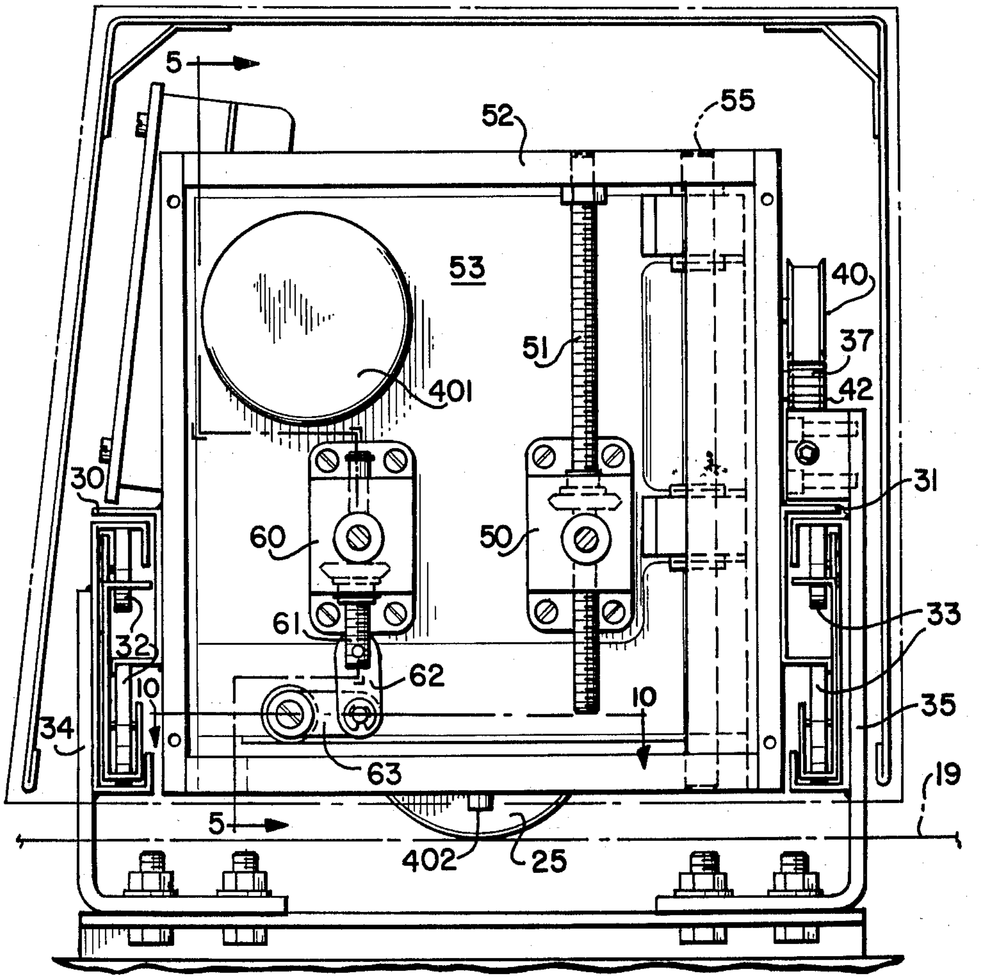
FIG. 4 is a side elevation view of a printing arm, with the front arm plate removed.

Telescopic motion of printing arm 12 is facilitated by left and right drawer slides 30 and 31, as best illustrated in FIG. 4. Drawer slides 30 and 31 ride on pairs of rollers 32 and 33, which are supported by left and right slide brackets 34 and 35 respectively.

Figure 7:
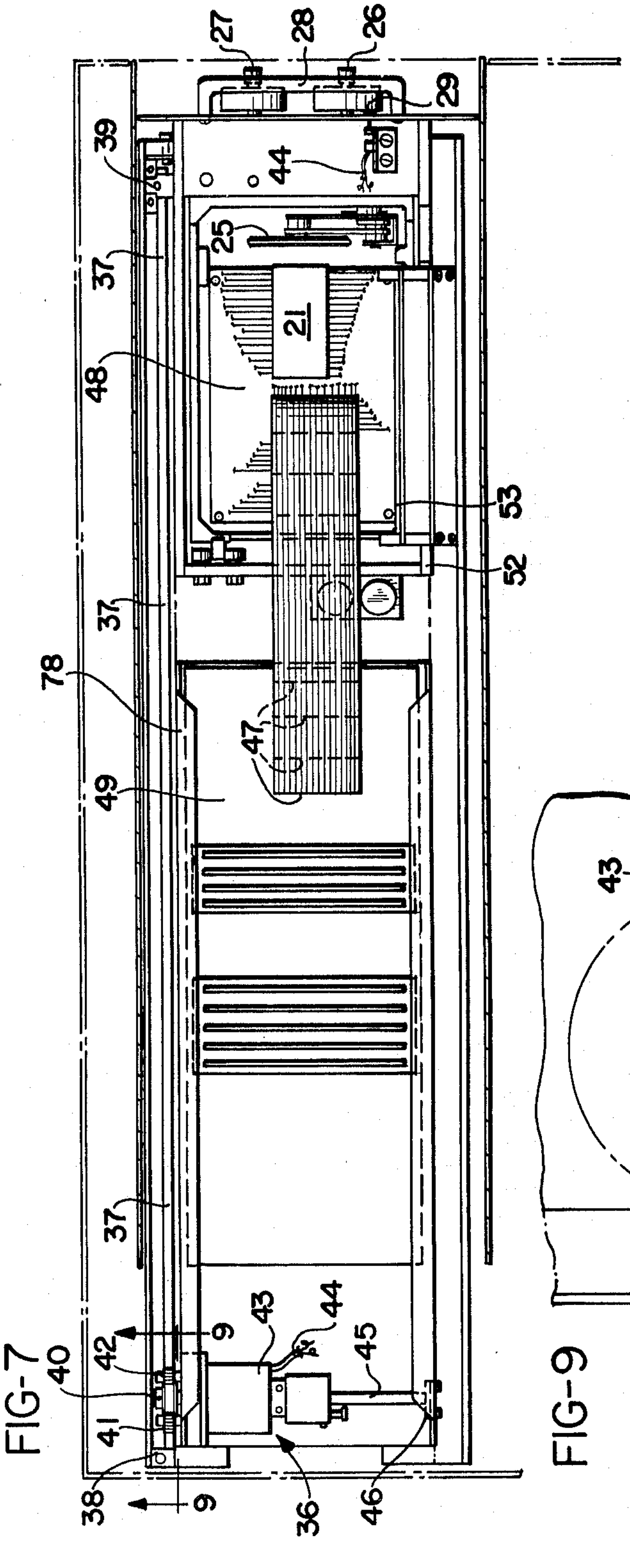
FIG. 7 is a partially cut away top plan view of a printing arm.
Figure 9:
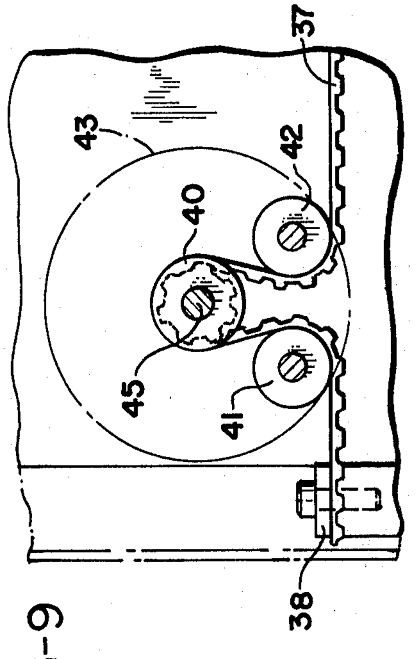
FIG. 9 is a view taken along lines 9—9 of FIG. 7.

The operation of the braking device for printing arm 12 is best understood with reference to FIGS. 7 and 9. As illustrated in FIG. 7, printing arm 12 is fully retracted within console 10. As printing arm 12 moves from the fully retracted, storage position to an operating position, it pulls a brake 36 along the length of a toothed belt 37, which is stretched between a pair of clamp plates 38, 39. Clamp plates 38, 39 are secured to side bracket 35. Brake 36 comprises a toothed pulley 40 for engaging the toothed side of belt 37 and a pair of idler rollers 41, 42 for engaging the smooth reverse side of belt 37.

Pulley 40 is mounted on a shaft 45, which rides in a bearing assembly 46 mounted within a horizontally extending channel in a vertical frame of console 10. During movement of printing arm 12, shaft 45 rotates within a solenoid 43. Brake 36 also comprises a braking disc (not illustrated) and a brake pad which is spring biased against one face of the disc for normally preventing rotation of shaft 45.

Solenoid 43 is connected by a line 44 to button 29 and also to an interlock circuit, not illustrated. The interlock circuit provides a safety feature preventing application of an actuating current to solenoid 43 when print head 21 is in a lowered position. When button 29 is depressed, with print head 21 in a fully raised position, solenoid 43 is actuated to force the above mentioned brake pad away from the brake disc. This allows rotation of shaft 45 by rolling action of pulley 40 against belt 37. During this condition the operator may position printing arm at any desired extension position by manual effort against handle 28.

Electrical connections to print head 21 are made via a series of flexible cables 47, which are connected to a printed circuit board 48 mounted for movement with print head 21. Electrical cables 47 extend inwardly toward another printed circuit board 49, which is mounted in frame 78. Frame 78 is mounted between drawer slides 30 and 31. Flexible fluid lines (not illustrated) supply pressurized printing ink from a supply tank in console 10 to print head 21. This accommodates both horizontal and vertical movement of print head 21 relative to console 10. Receptacles 85 (FIG. 1) are provided at a convenient location on console 10 to permit ready connection and disconnection of external electrical lines.

Figure 8:
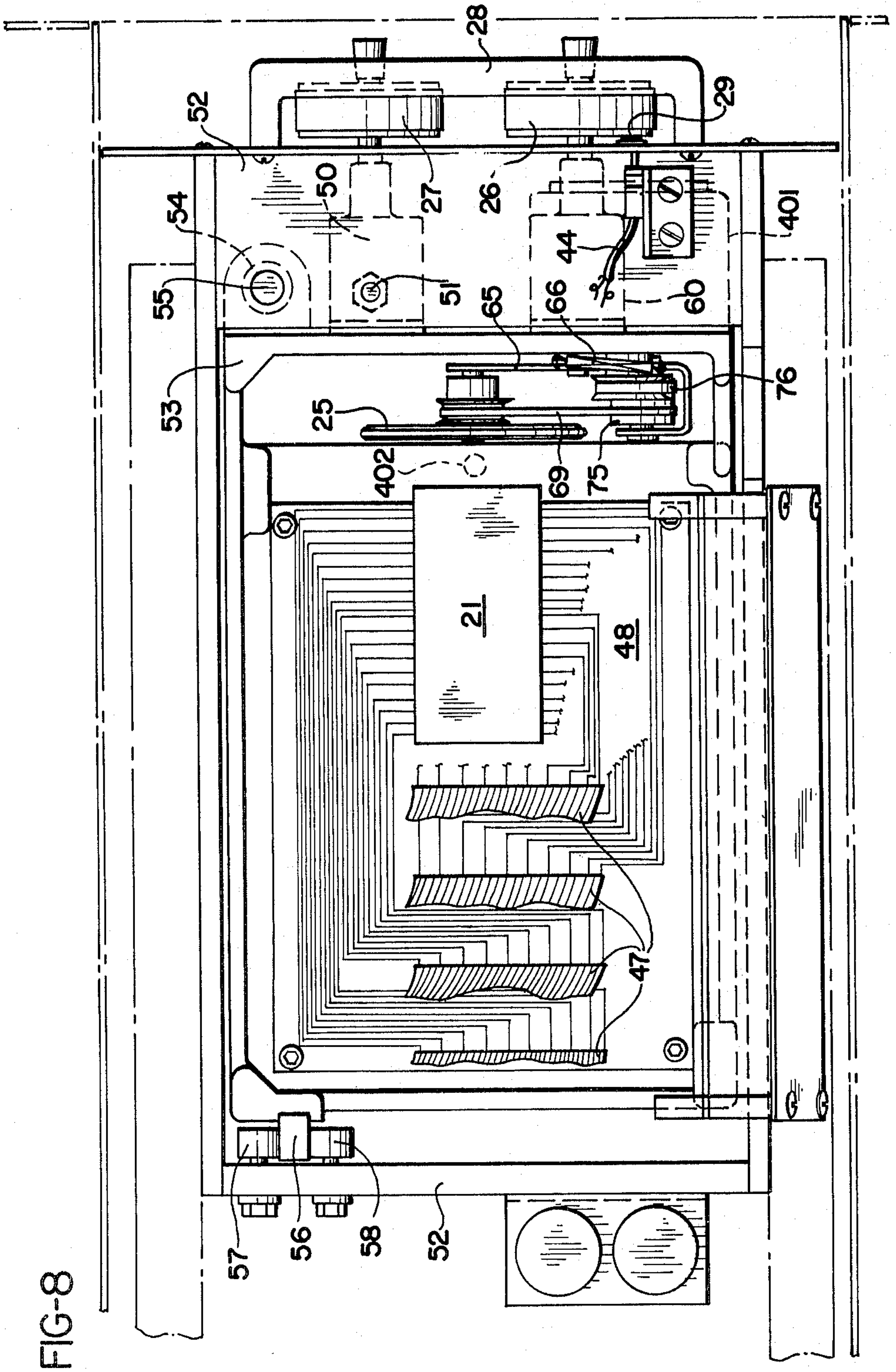
FIG. 8 is an enlarged view of a portion of FIG. 7.

Vertical movement of print head 21 within printing arm 12 is controlled by manual operation of control knob 27, as above described. Control knob 27 is connected to miter gear box 50 (see FIG. 4), which rides vertically up and down threaded shaft 51, when control knob 27 is rotated. Threaded shaft 51 is mounted on the frame 52 of printing arm 12. Miter box 50 is secured to carriage 53, which functions as a print head support member. Print head 21 and its printed circuit board 48 are mounted within carriage 53. Carriage 53 has a pair of linear ball bushings 54, which are guided vertically along a guide rod 55 (see FIG. 8). Carriage 53 also has a guide bar 56, which is guided by a pair of cam followers 57, 58. This arrangement provides smooth, controlled vertical movement of carriage 53 and print head 21 in response to rotation of control knob 27.

Figure 10:
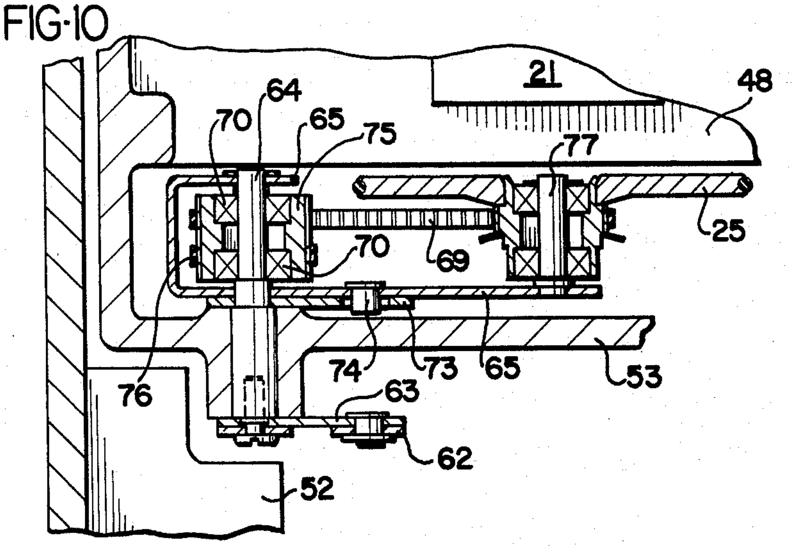
FIG. 10 is a view taken along lines 10—10 of FIG. 4.

Tachometer wheel 25 is also mounted upon carriage 53 for vertical movement therewith. However, tachometer wheel 25 has an adjusting mechanism for producing additional vertical motion of the tachometer wheel relative to the motion of print head 21. This movement of tachometer wheel 25 is generally illustrated by FIG. 6. For producing the above mentioned relative vertical movement of tachometer wheel 25, there is a miter gear box 60 connected to control knob 26. As control knob 26 is manually rotated by the operator, miter box 60 causes vertical movement of a threaded shaft 61, which is pivotally connected to a link 62 (see FIG. 4). Link 62 is pivotally connected to another link 63, which is fast to a shaft 64. Shaft 64 is journalled within carriage 53, so that shaft 64 is rotated relative to carriage 53, when control knob 26 is rotated (see FIGS. 5 and 10).

There is a link 73 (FIG. 10), which is mounted fast on shaft 64 and connected to a lever arm 65 by means of a loose fitting pin 74. Tachometer wheel 25 is pivotally mounted on a pivot pin 77 which is attached to lever arm 65, so that tachometer wheel 25 undergoes the motion illustrated in FIG. 6, when control knob 26 is rotated. The angular movement of lever arm 65 is about plus or minus 15°, so that the pivot point of tachometer wheel 25 moves vertically about plus or minus one-half inch relative to carriage 53. A spring 66 is connected between an ear 67 of lever arm 65 and an ear 68 of link 73. This permits slight movement of lever arm 65 relative to link 73 (as limited by the loose fitting connection at pin 74), while downwardly biasing tachometer wheel 25 against documents 19. Thus tachometer wheel 25 remains pressed against the documents during normally occurring variations in document thickness.

Tachometer wheel 25 engages a first timing belt 69, which drives a pulley 75. Pully 75 is mounted on ball bearings 70 for rotation about shaft 64. A second timing belt 76 engages pulley 75 so as to be driven thereby. Timing belt 76 engages another pulley 72 (FIG. 5), which provides rotational input to shaft encoder 401. Shaft encoder 401 is a conventional encoding device, which provides a digital output signal representing the speed of rotation of tachometer wheel 25.

The output from shaft encoder 401 is utilized for data output processing control, as generally illustrated by block 411 of FIG. 9. Block 411 represents a functional operation of a programmed microprocessor, but all functions thereof could be performed by hard wired elements. Other such data processing functional blocks are referred to on FIG. 9 as input processing 404, text buffer 405, format processing 406, label buffer 407, font processing 409, output buffer 410, bar data buffer 412, and central control 403.

Central control 403 responds to switching controls on the supervisor control panel 13 and switching controls on the operator control panel 14. As shown in FIG. 9, the central control 403 exercises general supervisory control over input processing 404, format processing 406, font processing 409 and output processing 411. Printing control information for an addressing job is carried by data tape 400 and font cartridge. Data tape 400 is mounted on tape drive unit 16, and font cartridge carries a programmed ROM as previously stated. Data tape 400 carries a series of binary codes representing the characters which are to be printed by the printing system. Font cartridge carries a series of bit patterns corresponding to the patterns of printed dots which are to be used for representing the characters in the preselected font.

During input processing the microprocessor reads tape 400 and transfers the information to text buffer 405. Text buffer 405 comprises first and second buffer portions A and B, as indicated on FIG. 9. Text buffers A and B are utilized on an alternating basis, with one buffer receiving processed input information, while the other buffer is reading out information for format processing.

Format processing block 406 designates that portion of the imaging process wherein the data from the text buffer is rearranged in "label" format. The information which is read out from one of the text buffers is reorganized so as to define a plurality of addresses (typically 16 or more). These addresses are stored in label buffer 407, which has label buffer portions A and B. Label buffer A and label buffer B operate on an alternating basis, with one buffer portion receiving information from format processing, while the other buffer portion supplies information for font processing.

Typically text buffer 405 comprises two 4 Kilobyte buffers. During format processing the characters within the text buffer are fetched one-by-one and used to fetch corresponding characters from a look-up table in a ROM. The translated characters are then stored in the label buffer being updated. The traslation is required to produce seven bit font call-out characters from six bit text data read from magnetic tape 400.

During font processing the microprocessor assembles charge ring control data through a character generation process performed on the label buffer characters. In order to perform this process the microprocessor reads a series of font control codes from the ROM within font cartridge 15. These codes are selectively read out therefrom as accessed by the codes in label buffer 407. The codes stored in the font ROM represent the actual dot patterns defining the various characters in the font which will be used for a particular addressing job.

The codes which are read out from the font cartridge are transferred to output buffer 410, which operates on a first-in-first-out basis. The data which is so stored in and read out from output buffer 410 is utilized for output processing, as generally indicated by block 411 of FIG. 9. The output processing function reorganizes the data from buffer 410 to accommodate the specific geometry of the jet arrangement and stores the reorganized data as printing control codes. As previously mentioned the jets are arranged in two staggered rows, and this therefore requires row-to-row switching delays as taught in Taylor et al U.S. Pat. No. RE28,219.

During output processing the microprocessor also responds to output signals from cue sensor 402. When cue sensor 402 provides a signal indicating the approach of a leading edge 24 of one of documents 19, the microprocessor begins a counting sequence during which tachometer signals from shaft encoder 401 are counted. The count continues until the document 19 has moved a sufficient distance for the address area 23 to be positioned beneath the jets 22. Printing control codes from bar data buffer 412 are transmitted along lines 413 as printing control signals to the charge rings 414. Charge rings 414 charge individual drops of ink on a selective basis, as previously described.

A suitable microprocessor for use in carrying out this invention is the Intel Model 8085, manufactured by Intel Corporation, but other microprocessors of at least equivalent data handling capability as required by this invention may be utilized. The microprocessor is programmed in a routine manner using a programming language appropriate to the particular equipment involved. It will be readily apparent, however, that the printing control signals need not be generated under control of a microprocessor. Alternatively suitable printing control signals may be generated by apparatus as taught in Van Brimer et al U.S. Pat. No. 3,803,628 or in Frey U.S. Pat. No. 3,913,719.

While the forms of apparatus herein described constitute preferred embodiments of the invention, it is to be understood that the invention is not limited to these precise forms of apparatus and that changes may be made therein without departing from the scope of the invention.

What is claimed is:

1. Ink jet printing apparatus for printing documents being transported along an independently operated conveyor comprising:

a control console;

a printing arm movably mounted on said control console for movement between a storage position which is clear of said conveyor and a printing position above said conveyor;

tachometer means supported by said printing arm for sensing the speed of movement of said documents and generating a corresponding tachometer signal;

printing control means mounted within said control console for receiving said tachometer signals and generating printing control signals in synchronism therewith;

a print head carriage movably supported by said printing arm;

print head positioning means for adjusting the vertical position of said carriage relative to said printing arm; and an ink jet printing head mounted on said carriage; said ink jet printing head comprising means for generating a plurality of printing jets arranged in at least one line extending in a sideward direction generally transverse to the direction of document travel along said conveyor, and means for controlling the printing operation of said printing jets in response to said printing control signals.

2. Apparatus according to claim 1 wherein said control console is mounted on wheels for ready portability.

3. Apparatus according to claim 1 and further comprising sensing means for sensing the leading edges of said documents; said printing control means being responsive to said sensing means for timing the initiation of printing by said ink jet printing head.

4. Apparatus according to claim 1 wherein said sensing means comprise a non-contact sensor mounted on said carriage.

5. Apparatus according to claim 1, further comprising tape drive means mounted on said console for receiving and reading a magnetically encoded data tape, and cartridge receiving means within said console for receiving a cartridge carrying programmed font storage means; said printing control means being connected for reading said tape and said programmed font storage means and generating said printing control signals in correspondence therewith.

6. Apparatus according to claim 1 further comprising a first control panel mounted on said control console and a second control panel mounted on said printing arm; said control panels being connected for controlling operations of different degrees of complexity.

7. Apparatus according to claim 1 wherein said printing arm is telescopically received within said console and is moved to said printing position by sliding movement in said sideward direction.

8. Apparatus according to claim 7 and further comprising a normally actuated brake for preventing sliding motion of said arm and manually actuated release means for momentarily releasing said brake and enabling said sliding motion to occur.

9. Apparatus according to claim 1 wherein said tachometer means are mounted on said print head carriage.

10. Apparatus according to either of claims 1 or 9 wherein said tachometer means comprises a tachometer wheel rotatably mounted for rotation by contact against said documents and an encoder driven by said tachometer wheel and operative to generate said tachometer signal.

11. Apparatus according to claim 10 and further comprising means for changing the vertical position of the axis of rotation of said tachometer wheel relative to said carriage.

12. Apparatus according to claim 11 and further comprising means permitting slight vertical adjusting movement of said tachometer wheel and spring means biasing said tachometer wheel downwardly within the stroke of said adjusting movement.

13. Ink jet printing apparatus comprising:

a control console;

a printing arm telescopically received within said console and slidably movable between an internal storage position and an external printing position a print head carriage movably supported by said printing arm;

print head positioning means for adjusting the vertical position of said carriage relative to said printing arm;

printing control means mounted within said console for generating printing control signals; and an ink jet printing head mounted on said carriage and connected for control by said printing control signals.

14. Apparatus according to claim 13 and further comprising tachometer means supported by said printing arm for generating a tachometer signal indicating the speed of movement of a document being transported past said ink jet printing head, and means within said printing control means for causing said printing control signals to be generated in synchronism with said tachometer signal.

15. Apparatus according to claim 13 wherein said print head positioning means comprises a first threaded shaft vertically mounted within said print arm, a first miter box secured to said carriage and in engagement with said shaft, and a first adjustment knob for adjusting the engagement position between said miter box and said shaft.

16. Apparatus according to claim 15 and further comprising a tachometer wheel pivotally supported by said carriage, tachometer wheel positioning means for vertical movement of said tachometer wheel relative to said carriage, encoding means connected to said tachometer wheel for generating a tachometer signal indicating the rotational speed of said tachometer wheel, means for carrying said tachometer signal to said printing control means, and means within said printing control means for causing said printing control signals to be generated in synchronism with said tachometer signal.

17. Apparatus according to claim 16 and further comprising a lever arm which is pivotally supported by said carriage and a pivot pin for mounting said tachometer on said lever arm; said tachometer wheel positioning means being connected for causing pivotal movement of said lever arm about its point of pivotal support.

18. Apparatus according to claim 17 wherein there is a loose fitting connection between said lever arm and said carriage; said apparatus further comprising spring means for downward biasing of said lever arm against said loose fitting connection.

19. Apparatus according to claim 18 wherein said tachometer wheel positioning means comprises a second threaded shaft connected to said lever arm, a second miter box secured to said carriage and threadably engaging said second threaded shaft, and a second adjustment knob for adjusting the engagement position between said second miter box and said second threaded shaft.

20. Apparatus according to claim 19 and further comprising a normally actuated brake for preventing sliding motion of said arm and manually actuated release means for momentarily releasing said brake and enabling said sliding motion to occur.

21. Apparatus according to any of claims 13 through 20 and further comprising sensing means supported by said printing arms for sensing the leading edge of a document being transported past said ink jet printing head and generating a cue signal in response thereto; said printing control means comprising means for timing the initiation of said printing control signals in response to said cue signal.

22. Apparatus according to claim 21 and further comprising a plurality of support wheels mounted on and supporting said console.

* * * * *